United States Patent [19]
Morimoto et al.

[11] Patent Number: 4,953,029
[45] Date of Patent: Aug. 28, 1990

[54] INTERCHANGEABLE FILM BACK OR STILL VIDEO BACK STILL CAMERA SYSTEM

[75] Inventors: Yasuhiro Morimoto, Takatsuki; Mitsuru Saito, Ibaraki; Tadahiro Yoshida, Takatsuki; Nobuyuki Taniguchi, Nishinomiya, all of Japan

[73] Assignee: Minolta Camera Kabushiki Kaisha, Osaka, Japan

[21] Appl. No.: 125,390

[22] Filed: Nov. 25, 1987

[30] Foreign Application Priority Data

Nov. 29, 1986 [JP]  Japan ................................. 61-285156

[51] Int. Cl.⁵ ............................................. H04N 5/225
[52] U.S. Cl. ..................................... 358/229; 358/227; 358/909; 354/75
[58] Field of Search ............... 358/209, 227, 229, 909; 354/21, 69, 75, 76, 104, 159, 161, 210, 145.1

[56] References Cited

U.S. PATENT DOCUMENTS

| | | | |
|---|---|---|---|
| 4,303,322 | 12/1981 | Someya | 354/31 |
| 4,572,638 | 2/1986 | Nakai et al. | 354/286 |
| 4,583,831 | 4/1986 | Harvey | 354/106 |
| 4,742,369 | 5/1988 | Ishii et al. | 354/441 |
| 4,763,146 | 8/1988 | Niikura | 354/75 |
| 4,774,536 | 9/1988 | Inoue et al. | 354/106 |
| 4,814,811 | 3/1989 | Saito et al. | 354/412 |
| 4,823,199 | 4/1989 | Sakakibara et al. | 358/335 |
| 4,855,837 | 8/1989 | Saito et al. | 360/35.1 |
| 4,862,293 | 8/1989 | Tanimoto | 358/229 |

FOREIGN PATENT DOCUMENTS 1525025  9/1978  United Kingdom .

OTHER PUBLICATIONS

"Minolta 9000 Product Guide", pp. 1-3, 17, and 26-27.

Primary Examiner—James J. Groody
Assistant Examiner—Robert M. Bauer
Attorney, Agent, or Firm—Burns, Doane, Swecker & Mathis

[57] ABSTRACT

A still camera system is capable of being loaded with a film back or a still video back selectably or of changing focal length information of an objective lens in use so as to correspond to the image size of the still video back, whereby when loaded with the still video back, the operational condition of a focal length dependent portion is set in accordance with changed focal length information.

7 Claims, 7 Drawing Sheets

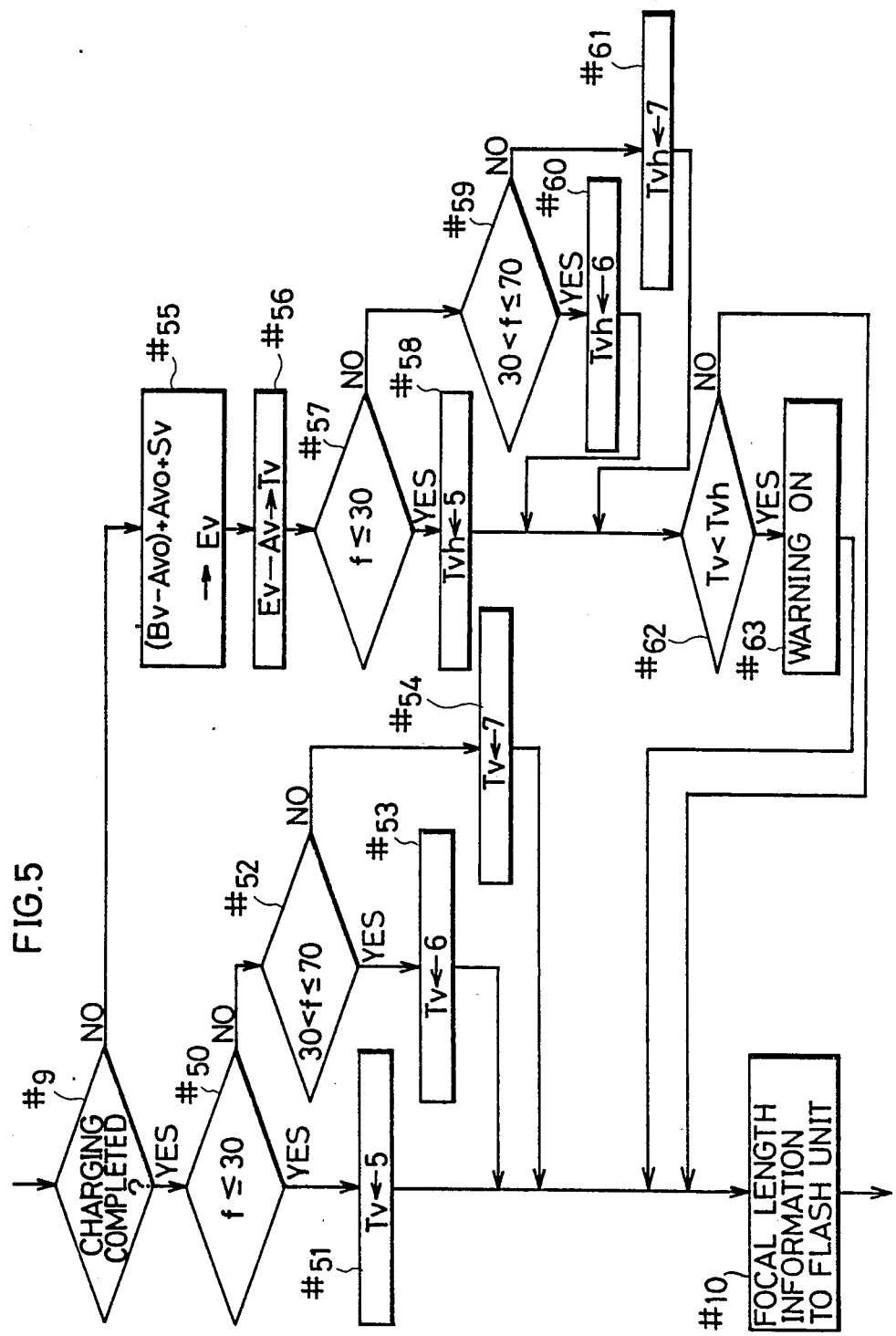

INTERCHANGEABLE FILM BACK OR STILL VIDEO BACK STILL CAMERA SYSTEM

BACKGROUND OF THE INVENTION AND RELATED ART STATEMENT

This invention relates to a still camera system which is able to be selectably loaded with a film back or a still video back.

There has been disclosed an electronic still camera which takes a still image using a solid state image pickup device such as charge-coupled device (hereinafter referred to as CCD) and then records the still image in a magnetic disc. For example, at pages 80 to 85 of NIKEI ELECTRONICS issued on July 2, 1984, a Japanese Magazine has been introduced such a camera.

Also, Minolta Camera Kabushiki Kaisha, the asignee of the present invention, has filed a Japanese utility model application of 36821/1986 relating to a still camera able to selectably load a camera body with a still video back or a film back. This type of a still camera is constructed in such a manner that a still video back including a solid state image pickup device and an image processing circuit is removably attached to a usual camera body for carrying a film back. Also, the camera is constructed in such a manner that even when loaded with the still video back, the whole size does not become large and the appearance is nearly similar to a popular single-lens reflex camera. When loaded with the film back in place of the still video back, an image is formed on the film plane in the same manner as a usual single-lens reflex camera.

When a CCD of ⅔-inch measured diagonally is used as a solid state image pickup device of the still video back, the size of an effective image frame of the CCD equals about a quarter of that of the 35 mm film frame. Also, when a relay optical device provided in the still video back for reducing the image size of the 35 mm film to that of ⅔-inch CCD has a magnification of ½, the image size of the CCD equals a half of the actucal image size of the 35 mm film as understandable from the following calculation: ¼/½ = ½ This is identical with a phenomenon which occurs when the focal length of an objective lens in use is made double. Accordingly, it will be apparent that when loaded with the still video back, undesirable results arise in means which is operated in accordance with the focal length information. The following means are operated in accordance with the focal length information: flashlight emission angle setting means, program line selection means for use in programmed automatic exposure control, means for selecting a reference value for warning camera shake, and shutter speed selection means for use in flashlight photography.

In such a still camera system, the program line selection, reference value for warning camera shake, shutter speed for flashlight photography and flashlight emission angle are set for the film back photography. Consequently, when loaded with the still video back, there arises a problem that the above-mentioned means fails to properly operate corresponding to actual photography condition.

Accordingly, an object of the present invention is to obviate the above-mentioned problems of the prior art.

Another object of the present invention is to provide a still camera system which is able to be loaded with a film back or a still video back selectably and able to provide focal length information corresponding to the frame size of still video back.

Further objects and advantages of the present invention will be apparent from the follwoing description of the invention

SUMMARY OF THE INVENTION

A still camera system in accordance with the present invention is able to load a camera body with a film back or a still video back selectably. The still camera system includes means for changing the focal length information of an objective lens in use corresponding to the image size of the still video back when loaded with the still video back.

Accordingly, the operational condition of means operated in accordance with focal length information can be corresponded to the still video back.

BRIEF DESCRIPTION OF DRAWINGS

FIG. 5 is a detailed flow chart of a shutter speed setting operation of FIG. 4;

DETAILED DESCRIPTION OF A PREFERRED EMBODIMENT

Figure 1:
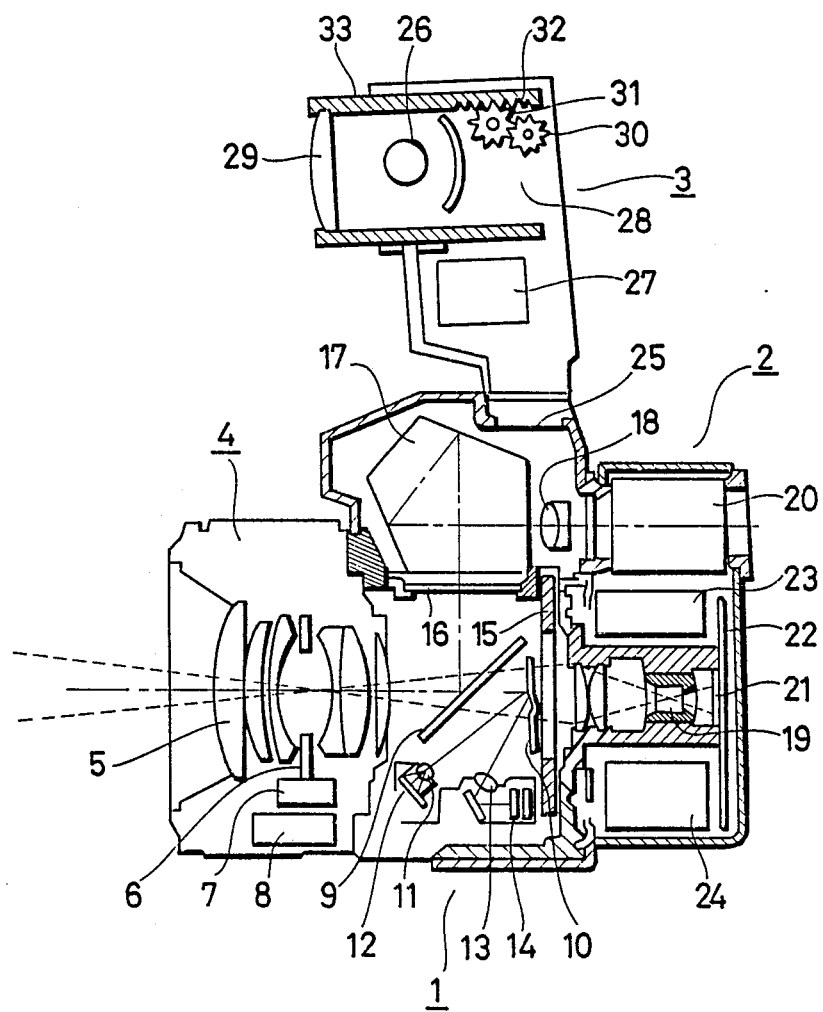
FIG. 1 is a sectional view of a still camera system according to the present invention which is loaded with a still video back.

Referring to FIG. 1 showing a section of a still camera system of the present invention, a camera body 1 having the same construction as a usual single-lens reflex camera is loaded with a still video back 2 in place of a film back, and a flash unit 3 over a pentaprism 17. An interchangeable lens 4 is provided with an objective lens 5, a diaphragm aperture 6, a diaphram aperture driving mechanism 7, and a ROM chip 8 holding information concerning the lens, such as a focal length and a full-open diaphragm aperture value. The camera body 1 carries a main mirror 9 for introducing an image to a viewfinder, a submirror 10 for reflecting light passed through a half transparent portion of the main mirror 9 for the light measurement and the focus detection, a photocell 12 for measuring the brightness of the subject in natural light or flashlight by receiving light reflected by the submirror 10 and passed through a lens 11, a CCD line sensor 14 for measuring the focussing condition of the interchangeable lens 4 by receiving light reflected by the submirror 10 and passed through a lens 13. The plane corresponding to the film plane is disposed near the rear surface of a focal plane shutter 15. A viewfinder portion in the camera body includes a focus plate 16, the pentaprism 17, and an eyepiece lens 18. The still video back 2 includes a relay optical portion 19 for reducing the image size of the 35 mm film frame to that of ⅔-inch, a relay viewfinder portion 20 for shifting the eyepoint of viewfinder to the rear of the still video back 2, a signal processing circuit board 22 having a CCD image sensor 21, an image forming circuit 23 having a recording circuit, a control circuit 24 having a still video back control microcomputer, a mechanical device (not shown) having a motor for driving a head for recording an image in a magnetic disc. The flash unit 3, which is mounted on an hot shoe 25 of the camera body 1, is equipped with a flash control circuit 27 for controlling activation of a xenon lamp 26, means 28 for setting flashlight emission angle to be driven based on focal length information of the interchangeable lens 4, and lens 29 for light projection. The flashlight coverage setting means 28 includes a motor, a motor control circuit, a transmission gears 30, 31 for transmitting the rotation of the motor, a rack gear 32 meshed with the gear 31, a cylinder 33 holding the lens 29 on the forward end thereof, whereby the lens 29 is moved backward and forward in accordance with the focal length information of the lens 4.

Figure 2:
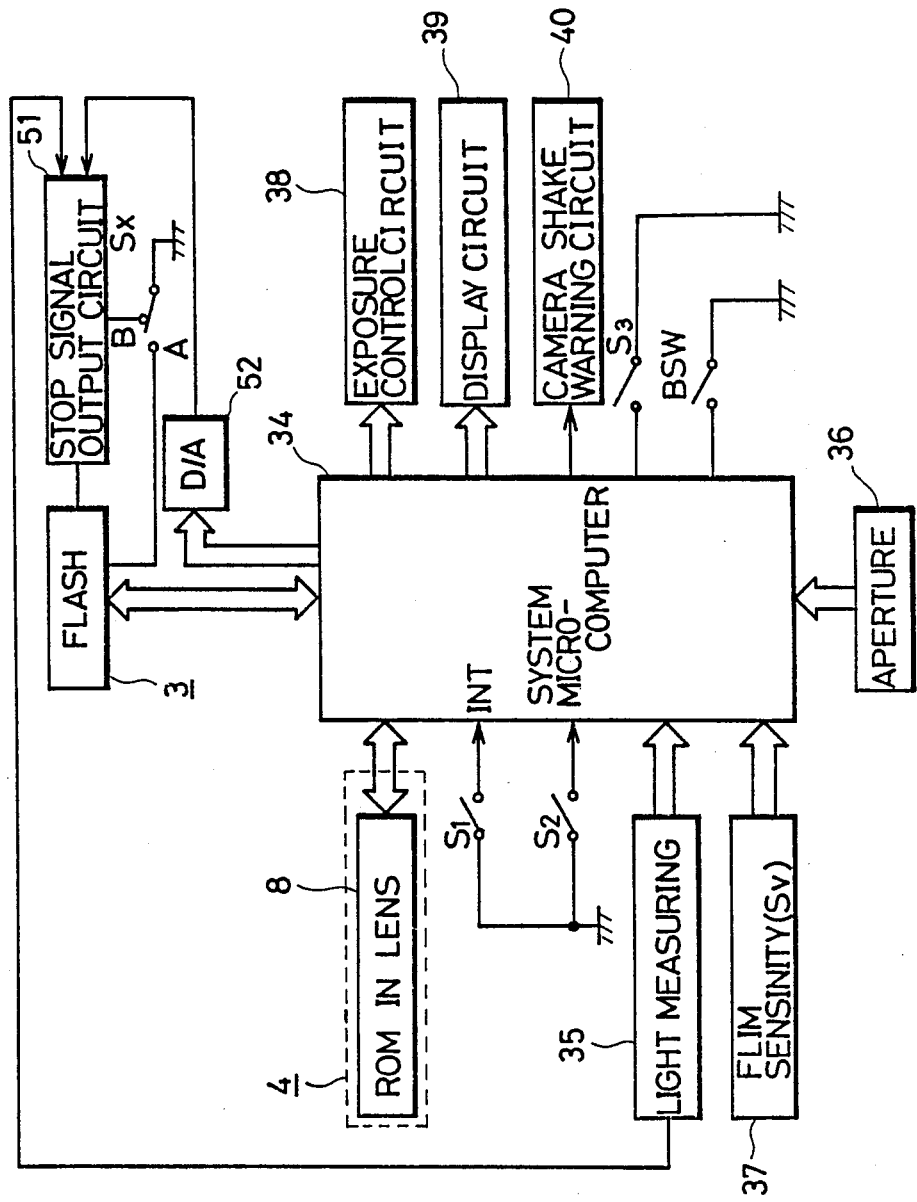
FIG. 2 is a block diagram of the still camera system.

Referring to FIG. 2, a block diagram of the main part of the still camera system, indicated at 34 is a system microcomputer constituting the central part of the system, which is provided in the camera body 1. Indicated at S1 is a light measuring switch, which is turned on when a release button is touched or pressed halfway. When the switch S1 is turned on, the following operations are started: focus-detecting, light-measuring, displaying and the like. Indicated at S2 is a release switch which is turned on when the release button is pressed down all the way. Following the turn-on of the release switch S2, the shutter release operation is started. The ROM chip 8 provided in the interchangeable lens 4 is communicated with the system microcomputer 34 to send and receive data. The focal length information of the objective lens 4 is sent from the ROM chip 8. Also, the system microcomputer 34 communicates with the flash unit 3. Furthermore, the system microcomputer 34 receives measured data from a light measuring circuit 35, a diaphragm aperture value from an aperture setting circuit 36, and film sensitivity from a film sensitivity setting circuit 37.

Based on these data, the system microcomputer 34 calculates and sends exposure data, display data, and a camera shake warning signal to an exposure control circuit 38, display circuit 39 and camera shake warning circuit 40 respectively. Indicated at BSW is a switch for informing which of the film back and still video back is loaded. The OFF state of the switch BSW represents the film back loading and the ON state the still video back loading. The switch BSW is formed by providing a mechanical sensor, photoelectrical sensor, magnetical sensor, or pattern recognition sensor in a portion of the camera body 1 in which the film back or the still video back is to be attached, or in a portion of the camera body 1 which is opposite to the back to be attached. Alternatively, the function of the switch BSW may be carried out by a signal which is sent from the still video back 2 through a connection line of the camera body 1 and the still video back 2.

Figure 3:
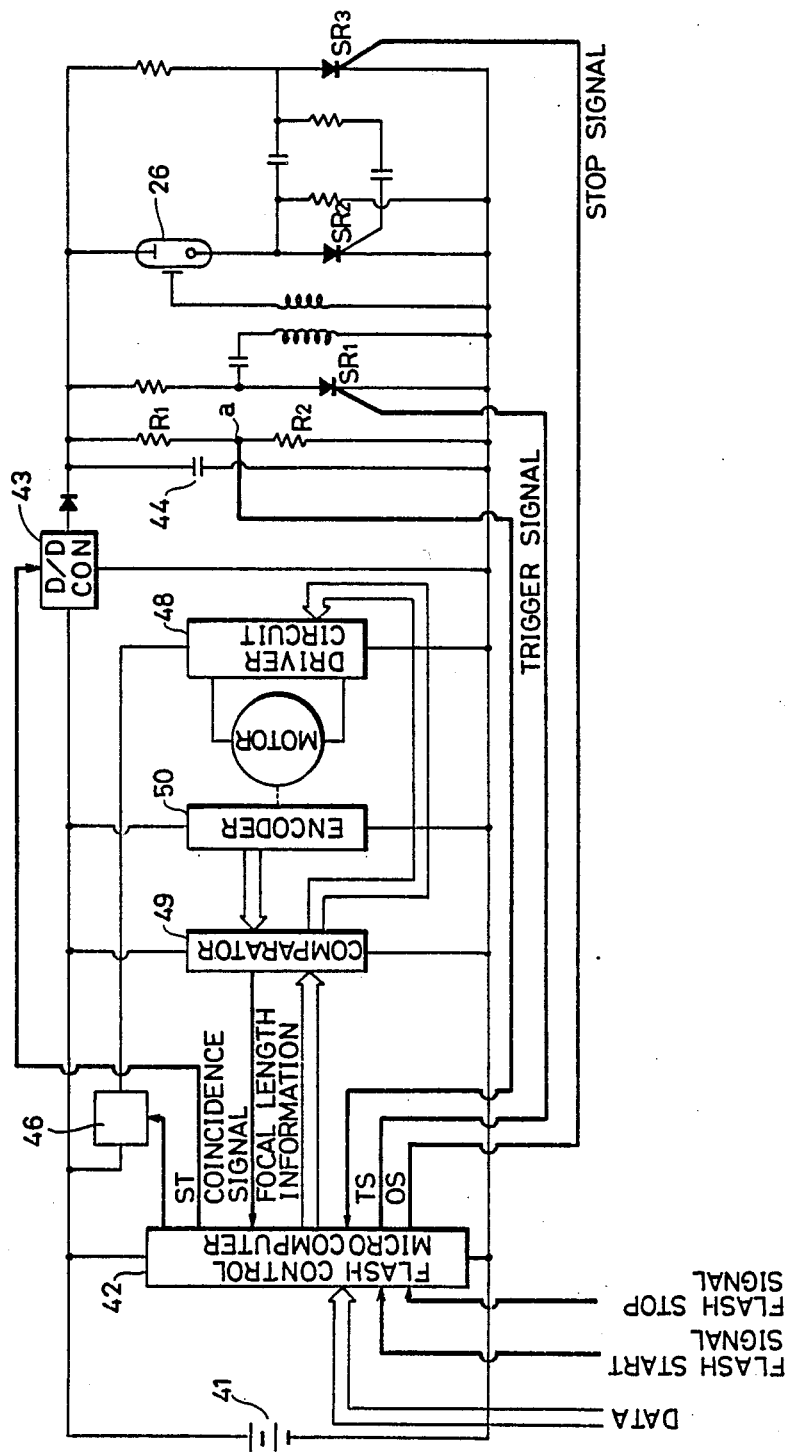
FIG. 3 is a circuit diagram showing a detailed construction of a flash unit of the still camera system.

Referring to FIG. 3 showing a detailed circuit of the flash unit 3, indicated at 41 is a battery and 42 is a flash control microcomputer. Indicated at 43 is a boosting circuit including DC-DC converter for raising a low voltage to a high voltage required to activate the xenon lamp 26. The high-voltage direct current from the circuit 43 is charged in a main capacitor 44. The charging of the main capacitor 44, that is, the boosting operation of the circuit 43 is started by a charging start signal ST sent from the system microcomputer 34 through the flash control microcomputer 42. The flash control microcomputer 42 checks the charging state of the main capacitor 44 based on voltage at an intermediate point Y between shunt resistors R1 and R2, which are connected in parallel to the capacitor 44. When the voltage at the intermediate point Y reaches a predetermined value, the flash control microcomputer 42 stops the boosting operation of the circuit 43 by sending a signal to the circuit 43, so that the charging of the capacitor 44 stops. In other words, the charging of the capacitor 44 is completed. Accordingly, the xenon lamp 26 can be activated at a desirable time. The xenon lamp 26 is activated in the following way. A trigger signal TS is sent from the flash control microcomputer 42 to a first thyristor SR1, so that a trigger signal is given to the xenon lamp 26. Sequentially, a second thyristor SR2 comes to ON and flashlight is then produced. The activation of the xenon lamp 26 is stopped by sending a stop signal OS to a third thyristor SR3 so that the second thyristor SR2 comes to OFF. Indicated at 46 is a circuit for switching electric power for a motor 47 of a flashlight emission angle setting means. The circuit 46 is given a command signal from the flash control microcomputer 42.

When the switching circuit 46 is turned on, electric power is supplied to a driver circuit 48 of the motor 47.

Indicated at 50 is an encoder which converts information concerning the position of the cylinder 33 or the lens 29 shifted by rotation of the motor 47 to focal length information and provides the converted information to a comparator 49. The comparator 49 compares the information from the encoder 50 with the focal length information of the interchangeable lens sent from the flash control microcomputer 42 and sends a signal corresponding to a difference between them to the driver circuit 48. When the information from both sides coincides with each other, a coincidence signal is sent to the flash control microcomputer 42 as well as the driver circuit 48. In response to the coincidence signal, the flash control microcomputer 42 sends a stop signal to the switching circuit 46. The driver circuit 48 allows the motor to rotate in the forward direction or the backward direction in accordance with the difference. When receiving the coincidence signal, the driver circuit 48 suspends the motor 47.

Figure 4:
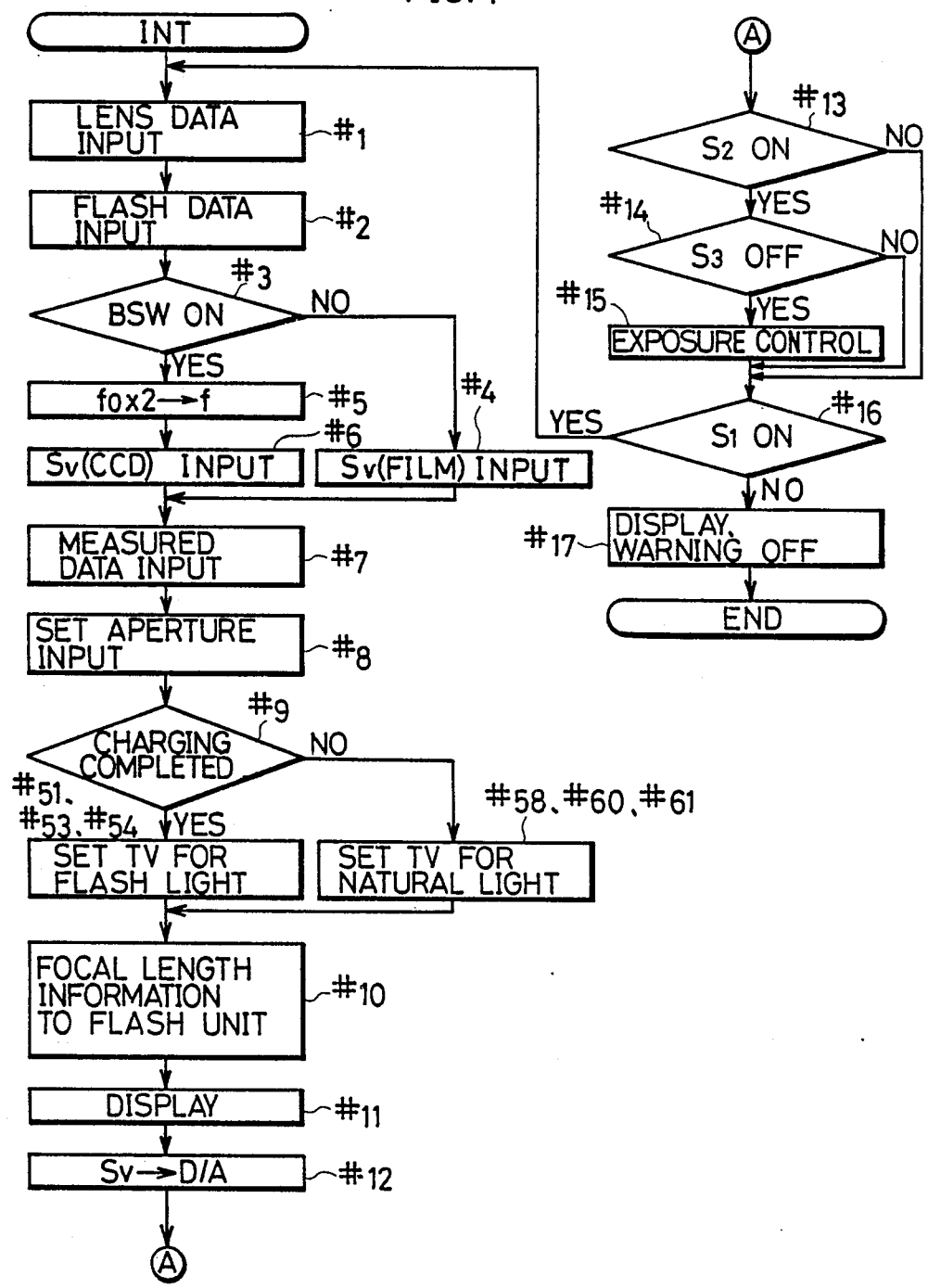
FIG. 4 is a flow chart of the operation of FIG. 2.

The operation of the camera system will be described with reference to FIGS. 4 and 5. When the release button is touched, the light measuring switch S1 is turned on and electric power is supplied to peripheral circuits. At the same time, in other words, at step #1, lens data including the focal length f and full-open diaphragm aperture value Avo of the interchangeable lens 4 is sent to the system microcomputer 34 from the ROM chip 8 carried by the interchangeable lens 4. Also, the flash unit 3 sends data to the system microcomputer 34 at step #2. At step #3, then, it is determined whether the switching means BSW is turned on. When the switching means BSW is in OFF state, in other words, the film back is attached, the sensitivity (Sv) of film is put in the system microcomputer 34 at step #4. When the switching means is in ON state or the still video back is mounted, the system microcomputer 34 doubles a focal length given from the interchangeable lens and stores the doubled focal length as the focal length information at step #5. For example, if the focal length of the lens is f0, 2f0 is put into the system microcomputer 34 as the focal length information for the still video back. Also, at step #6, the sensitivity of the CCD image sensor of the still video back is stored in the system microcomputer 34 as the sensitivity of film.

At step #7, light measurement data (Bv-Avo) is put into the system microcomputer from the light measuring circuit 35. Furthermore, when a diaphragm aperture priority automatic exposure control mode is selected, a set aperture value Av is put in the system microcomputer 34 from the aperture setting circuit 36 at step #8. Next, the shutter speed Tv is calculated based on the set aperture value, measured data and film sensitivity.

However, it is necessary to change the shutter speed Tv according to whether the flash unit 3 is ready for flashing. Whether the flash unit 3 is ready for flashing is determined based on whether the main capacitor 44 is completely charged. Specifically, at step #9, the system microcomputer 34 determines whether the main capacitor 44 is completely charged based on a signal sent from the control microcomputer 42 checking the voltage at the intermediate point Y shown in FIG. 3.

When the main capacitor 44 is charged, a shutter speed for flashlight photography is set as the control shutter speed Tv at steps #51, #53, #54 independently of the shutter speed calculated from the set aperture, measured data and film sensitivity. On the other hand, when the charging of the main capacitor 44 is not completed, the calculated shutter speed is set as the control shutter speed Tv for natural light or daylight photography at steps #55 and #56.

A detail of this shutter speed setting is shown in FIG. 5. When the charging of the main capacitor 44 is completed, the program follows the left side route of FIG. 5 in which the control shutter speed Tv is determined according to the focal length information. At step #50, it is checked whether the focal length is equal to or smaller than 30 mm. When the focal length is equal to or smaller than 30 mm, the shutter speed is set at 5 in APEX unit (1/30 seconds) at step #51. When the focal length is not larger than 30 mm, the program proceeds to step #52 at which it is checked whether the focal length is larger than 30 mm and is equal to or smaller than 70 mm. When the focal length is in the above-range, the shutter speed is set at 6 in APEX unit (1/60 seconds) at step #53. When the focal length is not in the above-range, the shutter speed is set at 7 in APEX unit (1/125 seconds) at step #54.

The above-mentioned shutter speed changing, in which the shutter speed is changed according to the focal length, gives an increased range to fill-in flash photography in which a photograph is taken using flashlight in daylight.

When the charging of the main capacitor 44 is not completed, the program follows the right side route in which the control shutter speed Tv is calculated from the film sensitivity (Sv), full-open diaphragm aperture (Avo), set aperture (Av), measured data (Bv-Avo) as follows:

$Ev = (Bv - Avo) + Avo + Sv$ (at step #55)

$Tv = Ev - Av$ (at step #56)

In this route, while the shutter speed Tv is not changed in accordance with the focal length, the camera shake warning reference value Tvh is changed in accordance with the focal length as shown at steps #57, #58, #59, #60 and #61. At step #62, then, it is determined whether Tv is smaller than Tvh. When Tv is smaller than Tvh, a camera shake warning signal is sent to the camera shake warning circuit 40 at step #63. As mentioned above, when the charging of the capacitor 44 is completed, the shutter speed is changed in accordance with the focal length. On the other hand, when the charging is not completed, the camera shake warning reference value is changed in accordance with the focal length. It will be noted that when loaded with the still video back 2, the focal length to be used in the program is twice the actual focal length f0 of the interchangeable lens 4, when loaded with the film back, the focal length is the same as the actucal focal length of the lens 4.

Referring to FIG. 3 again, after the control shutter speed Tv is set as mentioned above, the focal length information is sent to the flash unit 3 at step #10. At step #11, diaphragm aperture priority automatic exposure control mode, aperture value and shutter speed are displayed in the display circuit 39. At step #12, the film sensitivity data Sv is sent to the D/A converter 52. The data Sv is used for stopping the flashing of the flash unit 3.

At step #13, it is determined whether the switch S2 is in ON state. When the switch S2 is not in ON state, the program proceeds to step #16 at which it is determined whether the switch S1 is in ON state. When the switch S1 is in ON state, the program returns to step #1.

On the other hand, when the switch S2 is in ON state, the program proceeds to step #14 at which it is determined whether the advancing of film and cocking of shutter release mechanism (not shown) is completed. The determination is carried out by a switch S3 which is coupled with the shutter cocking mechanism. The OFF state of the switch S3 shows that the advancing of film and cocking of shutter are completed. More specifically, in the case of loading with the film back, the OFF state shows that the advancing one frame of film and cocking of shutter are completed. In the case of loading with the still video back, the OFF state shows only that the cocking of shutter is completed.

When the switch S3 is in OFF state or the advancing of film and cocking of shutter are completed, at step #15, the shutter is released and the exposure control is executed in accordance with the diaphragm aperture value and shutter speed set and calculated at the preceding steps. When the switch S3 is in ON state or the advancing of film and cocking of shutter are not completed, the program proceeds to step #16 without executing the exposure control.

At step #16, when the swich S1 is in ON state, the program returns to step #1 as mentiond above. When the swich S1 is not in ON state, the program proceeds to step #17 at which the display and warning are turned off. Then, the system microcomputer stops its operation.

Next, the operation of the flash unit shown in FIG. 3 will be described which is carried out in relation to the operation of the system microcomputer 34 carried by the camera body 1.

Initially, when the flash control microcomputer 42 receives data from the system microcomputer 34, the boosting circuit 43 is put into work and the charging of the capacitor 44 is started. At the same time, the flash control microcomputer 42 sends the system microcomputer 34 data including the completeness of charging and other information. As shown in FIG. 4, the system microcomputer 34 sends the lens data including focal length information to the flash control microcomputer 42 in a predetermined period. When the electric power switch circuit 46 is turned on, the motor driver circuit 48 is put into work to rotate the motor in accordance with the output of the comparator 49. Consequently, the cylinder 33 of the flashlight emission angle setting means 28 is moved backward and forward so as to change the position of the lens 29. During that time, the boosting operation of the boosting circuit 43 is suspended and the charging is not performed. The positional information on the cyliner 33 and lens 29 being moved by the rotation of motor is encoded to the focal length information by the encoder 50 and then compared with the focal length of the interchangeable lens 4 held in the flash control microcomputer 42 by the comparator 49. When the encoded information does not coincide with the focal length, the motor driver circuit 48 drives the motor 47 to rotate in the forward or backward direction in accordance with the output of the comparator 49 so as to attain a proper flashlight emission angle. When the encoded information coincides with the focal length, the coincidence signal is sent to the flash control microcomputer 42. Also, the electric power switch circuit 46 is turned off according to the coincidence signal and the lens 29 is stopped. In other words, it is attained to set a flashlight coverage corresponding to the focal length information.

When the exposure control is stared in the camera body 1 and the shutter is released to the full, a sychronizing switch Sx is changed from a contact B to a contact A. Consequently, a flash start signal is sent to the flash unit 3 and integration of the output of the light measuring circuit 35 is started in the stop signal output circuit 51. When receiving the flash start signal, the flash control microcomputer 42 sends the trigger signal to the first thyristor SR1 to start the activation of the xenon lamp 26. At this time, the integrated value of the stop signal output circuit 51 corresponds to the amount of flashlight projected to an object to be photographed and reflected thereon. When an integrated value reaches the value corresponding to the film sensitivity which is given by the D/A converting circuit 52, a stop singal is sent to the flash unit 3 from the stop signal output circuit 51. Consequently, the third thyristor SR3 is turned on to stop the activation of the xenon lamp 26.

When the flash control microcomputer 42 is not communicated with the system microcomputer 34 for a predetermined period, the boosting operation of the boosting circuit 43 is suspended.

It will be apparent that while the above embodiment is described in the diaphragm aperture priority automatic exposure control mode in which the diaphragm aperture value is firstly set and the shutter speed is calculated so as to correspond to the set aperture, the present invention is executable in a shutter speed priority automatic exposure control mode or a programmed automatic exposure control mode in which the diaphragm aperture and shutter speed are calculated in accordance with a predetermined program line.

Figure 6A:
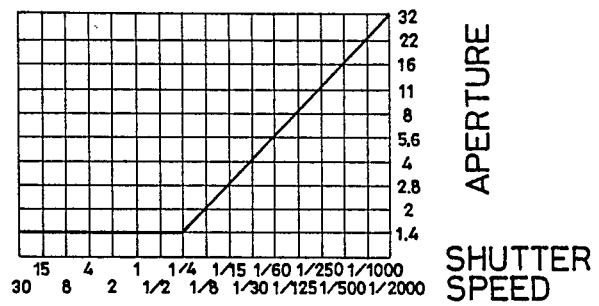
FIGS. 6a, 6b, 6c are views illustrating program line for use in programmed automatic exposure control.
Figure 6B:
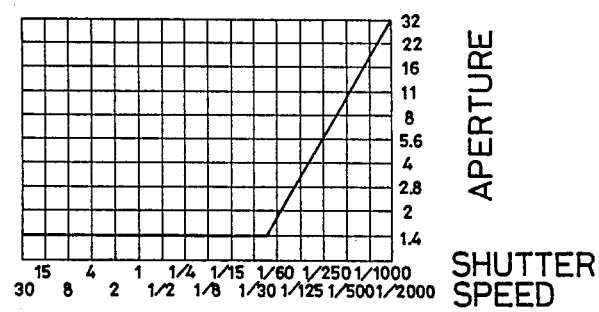
Figure 6C:
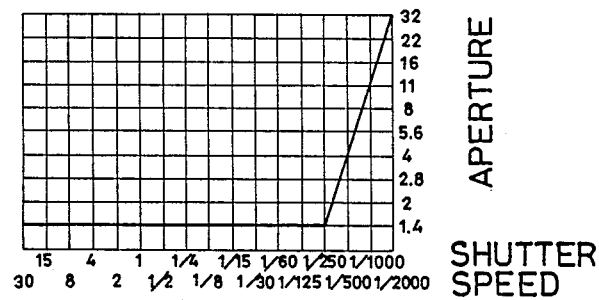

Next, the present invention will be described in a programmed automatic exposure control mode in which a most suitable program line is automatically selected based on the focal length information of the interchangeable lens in use from a plurality of program lines. FIG. 6 shows three program lines, specifically, wide program (A), standard program (B), tele program (C). The wide program sets a diaphragm aperture value larger than that of the standard program in the same brightness. The tele program sets a shutter speed faster than that of the standard program. For example, the wide program is selected when the focal length of lens is smaller than 30 mm, the standard program when the focal length is from 30 mm to 70 mm, and the tele program when the focal length is larger than 70 mm.

It will be apparent that when loaded with the still video back, the focal length information f is changed so as to correspond to the image size of a CCD image sensor carried by the still video back 2 in accordance with the present invention as the above embodiment in which the focal length information of the still video back is twice as long as that of the film back.

The operation of the programmed automatic exposure control mode will be described with reference to FIG. 7.

Figure 7:
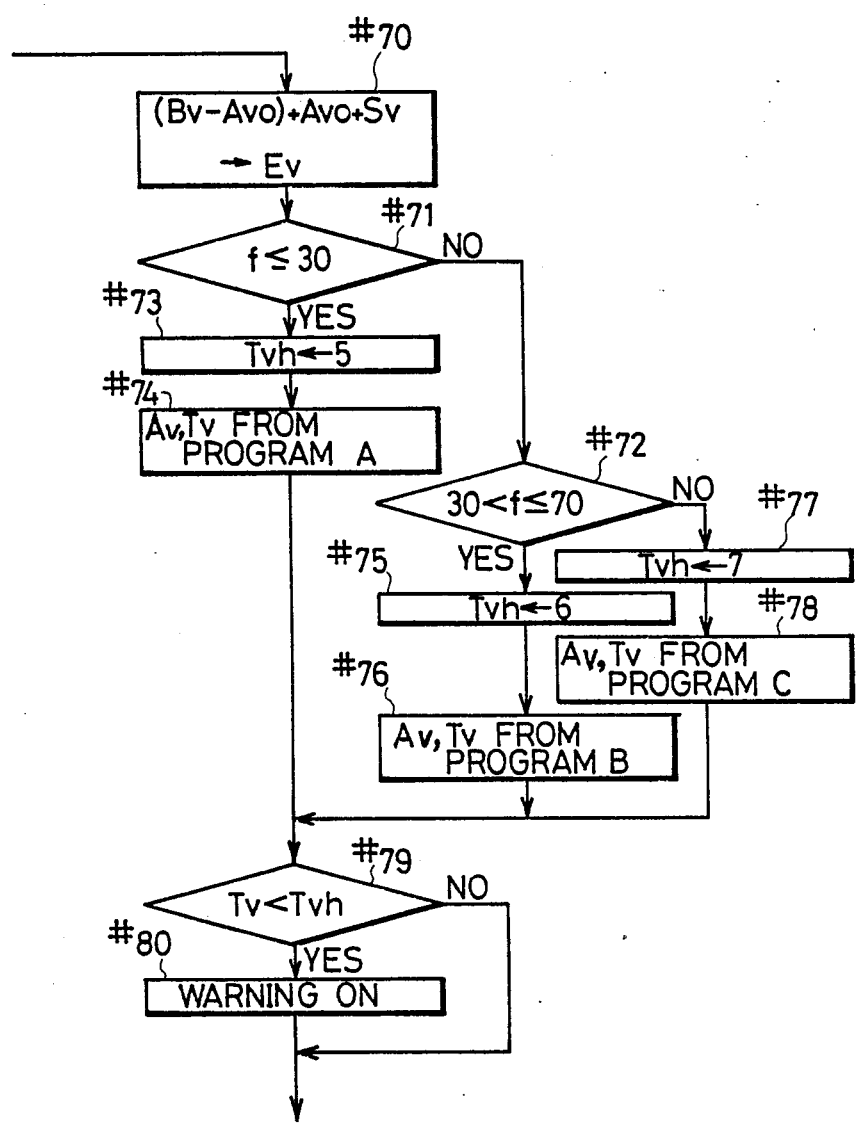
FIG. 7 is a flow chart similar to FIG. 5 but showing only a different portion.

It will be noted that since the operation in this mode is the same as the aperture priority automatic exposure control mode except for the operation in the case that the charging of the main capacitor 44 is not completed, a different portion is shown in FIG. 7. At step #70, the exposure value Ev is obtained from the follwing calculation:

$$Ev = (Bv - Avo) + Avo + Sv$$

At steps #71, 72, it is determined whether the focal length is smaller than 30 mm, from 30 mm to 70 mm or larger than 70 mm. When the focal length is smaller than 30 mm, the camera shake warning reference value Tvh is set at 5 in APEX unit at step #73 and the control shutter speed Tv and the control diaphragm aperture value Av are obtained according to the wide program (A) at step #74. When the focal length is from 30 mm to 70 mm, the value Tvh is set at 6 in APEX unit at step #75 and the control shutter speed Tv and the control diaphragm aperture value Av are obtained according to the standard program (B) at step #76. When the focal length is larger than 70 mm, the value Tvh is set at 7 in APEX unit at step #77 and the control shutter speed Tv and the control diaphragm aperture value Av are obtained according to the tele program (C) at step #78.

At step 79, it is determined whether the shutter speed Tv is smaller than the camera shake warning reference value Tvh. When Tv is smaller than Tvh, a warning signal is issued. When Tv is not smaller than Tvh, the program proceeds to step #10 of FIG. 4 at which the focal length information is sent to the flash control microcomputer.

As mentioned above, a still camera system of the present invention, in which when a camera body for use in a still film camera is loaded with a still video back, the focal length information is changed so as to correspond to the image size of the still video back, assuredly provides a suitable condition for the still video photography.

Particularly, the present invention, in which when loaded with a still video back, a flashlight emission angle setting means is controlled corresponding to the image size of the still video back, produces flashlight with a high efficiency and provides an increased flashlight emission angle.

Also, the present invention, in which when loaded with a still video back, selection of a suitable program line in a programmed automatic exposure control mode is performed based on the changed focal length information, eliminates the likelihood that a program line unsuitable to the still video back photography may be selected.

Furthermore, the present invention provides a camera shake warning reference value corresponding to the focal length information of the still video back.

Yet furthermore, the present invention provides a desirable shutter speed for the flashlight photography even when loaded with the still video back and assures an increased fill-in flashlight photography range.

What is claimed is:

1. A still camera system comprising a camera body capable of being loaded with a film back or a still video back selectably, focal length dependent means an operational condition of which is set in accordance with focal length information of an objective lens in use, and means for changing the focal length information so as to correspond to the image size of the still video back when said camera body is loaded with the still video back, whereby when loaded with the still video back, the operational condition of said focal length dependent means is set in accordance with changed focal length information.

2. A still camera system according to claim 1 wherein said still camera system includes an electronic flash device capable of changing flashlight emission coverage thereof, and said focal length dependent means is for setting the flashlight emission coverage in accordance with the focal length information.

3. A still camera system according to claim 1 wherein said camera body is operable in a programmed automatic exposure control mode having a plurality of program lines and said focal length dependent means is for selecting one of the program lines in accordance with the focal length information.

4. A still camera system according to claim 1 wherein said camera body includes detection means for detecting whether a shutter speed value to be controlled is slower than a reference shutter speed value likely to cause camera shake and means for warning of camera shake in accordance with the result of said detection means, and said focal length dependent means is for changing the reference shutter speed value in accordance with the focal length information.

5. A still camera system according to claim 1 wherein said still camera system includes an electronic flash device and said camera body includes a focal plane shutter and means for generating a shutter speed value suitable for flashlight photography when said flash device is ready for flashlight emission, and said focal length dependent means is for selecting the shutter speed for flashlight photography in accordance with the focal length information.

6. A camera system comprising: an objective lens;
focal length dependent means, an operational condition of which is set in accordance with focal length information of said objective lens;
an image receiving device on which an image of an object is projected by said objective lens; and
means for changing the focal length information so as to correspond to coverage of image reception to be received on said image receiving device.

7. A camera system according to claim 6, wherein said camera system includes a camera body capable of being loaded with a film back or a still video back selectably and said means for changing changes the focal length information so as to correspond to the image size of said still video back when loaded with said still video back.

* * * * *